June 5, 1934.   W. A. HART   1,961,928
BEARING BROACHING MACHINE
Filed May 18, 1931
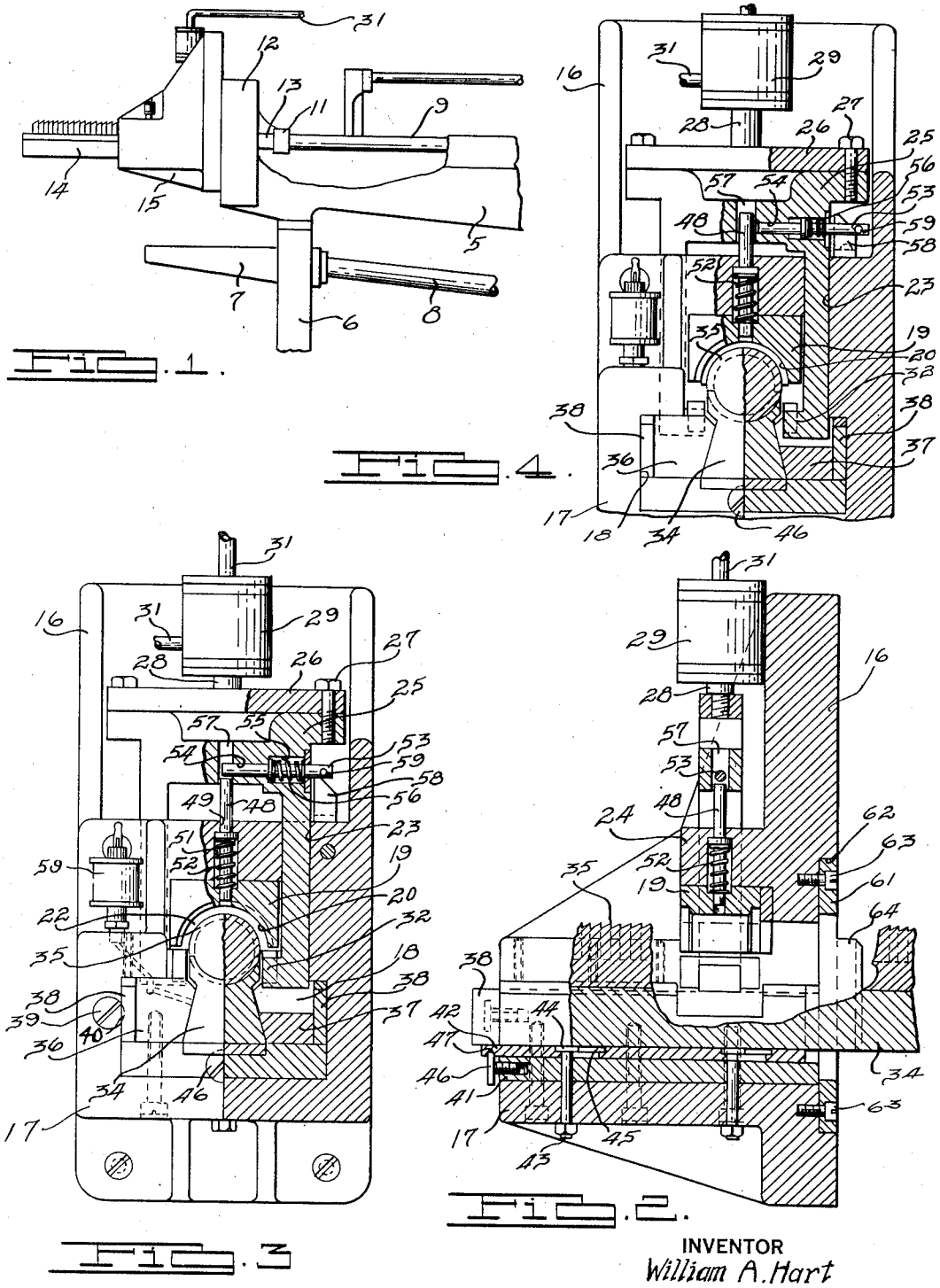
INVENTOR
William A. Hart
BY
Harness, Dickey, Pierce & Hanx.
ATTORNEYS.

Patented June 5, 1934

1,961,928

UNITED STATES PATENT OFFICE 1,961,928

BEARING BROACHING MACHINE

William A. Hart, Detroit, Mich., assignor to Colonial Broach Company, a corporation of Michigan Application May 18, 1931, Serial No. 538,191

5 Claims. (Cl. 90—33)

This invention relates to bearing broaching machines and particularly to a machine for supporting a bearing in fixed predetermined relation to a broaching cutter during its passage across the bearing surface thereof.

Among the objects of this invention are: to provide a fixture for a broaching machine which shall support a bearing in fixed relation to the path of movement of a broaching cutter; to provide means for positively forcing the bearing from its engaging structure after the positioning portion thereof has been moved therefrom; to provide a cutter for machining the surface of the bearing having a recess so positioned as to permit a bearing to be inserted within the holder; to provide means for adjusting the position of the cutter relative to the surface of the bearing to be machined; and to provide a machine which accurately broaches a finished surface on a bearing which is simple in construction, efficient in operation, and economical of manufacture.

Other objects and features of novelty of the invention will be either specifically pointed out or will become apparent when referring, for a better understanding thereof, to the following description in conjunction with the accompanying drawing, wherein:

Figure 1 is a broken view, in elevation, of a broaching machine embodying features of the invention, Figure 2 is an enlarged view, partly in section, of the bearing supporting portion of the machine illustrated in Figure 1, Figure 3 is an end view of the structure shown in Figure 2 with a part thereof in section, and with the movable portion thereof in clamped relation to the stationary portion for supporting a bearing, and Figure 4 is a broken view of the structure illustrated in Figure 3, with the bearing supporting structure in bearing released position.

Difficulty has been experienced, heretofore, when machining bearing shells to accurate dimensions, primarily because of the necessity of supporting the body portion of the shell in a jig for the purpose of forcing the shell into a true semi-circular shape. When the bearing surface is machined in any other manner the arcuate inner and outer surfaces thereof will have different centers and when the bearing shell is pressed into contigous relation with a receiving unit the inner surface will be distorted a similar amount to the distortion of the outer surface and considerable dressing will be required to have the bearing exactly encompass one half of a shaft.

In practicing the present invention, a recess is provided in a portion of a machine which is of exact contour to that of the recess of the bearing receiving unit and a member is provided for forcing the bearing into contiguous relation to the recess to have the bearing assume the exact shape which it will have when mounted in the receiving unit. The machine is so constructed that a broaching cutter may be passed across the surface of the bearing to accurately machine the shaft engaging surface thereof into predetermined relation with the outer surface of the bearing. Adjusting means is provided for the cutter to regulate the position of the center from which the cutting edges of the blades were struck relative to the center line of the arcuate outer surface of the bearing.

In Figure 1 a broaching machine is shown of the conventional type which includes a cradle 5 supported on its front end on a standard 6 which also supports a drip pan 7 which is connected by a conductor 8 to a suitable reservoir (not shown) for draining the oil from the pan thereto. A reciprocable bar 9 is attached to a head 11 which is supported on guide rails (not shown) in the cradle 5 and which is actuated by a suitable mechanism (not shown). A base plate 12 is mounted on the front end of the cradle 5 having an aperture through which an end 13 of the head 11 extends for the purpose of releasably engaging the end of a broaching cutter 14 which is drawn thereby through the base plate 12. A fixture 15 is supported on the base plate for the purpose of engaging and retaining a work piece in the nature of a bearing, in predetermined relation to the cutting edges of the broaching cutter 14.

The fixture 15 is shown enlarged in Figures 2, 3 and 4 as comprising a casting or body portion 16 attached by bolts or other suitable supporting means to the base plate 12 and provided with a frontwardly projecting portion 17 having an aperture 18 through which the broaching cutter 14 is reciprocated. A block 19 is removably supported in the casting or body portion 16 and is provided with a semi-circular recess 20 for receiving a bearing shell 22. Apertures 23 extend downwardly through the extending portions 24 of the body portion 16, on the sides of the block 19, for receiving a U-shaped frame member 25 which is slidably guided therein. A cross bar 26 is attached to the upper surface of the U-shaped member 25 by bolts 27 and is supported on a shaft 28 which extends from a hydraulic ram 29. The hydraulic ram is of the conventional type being provided with a piston (not shown) and suitable ports 31 which conduct a fluid on opposite sides of the piston for effecting its reciprocation and that of the shaft 28.

The lower ends of the U-shaped member 25 are provided with inwardly extending fingers 32 which are closely adjacent to, but spaced from, the sides of the cutter 14. The upper surface of the fingers engage the lower edges of the bearing shell 22 which have been accurately machined to predetermined dimensions. The upward movement of the fingers forces the outer surface of the shell into contiguity with the inner surface of the recess 20 when the frame 25 is actuated to its uppermost position by the upward movement of the shaft 28.

The broaching cutter 14 includes a body portion 34 and a cutting portion 35 of arcuate shape which increases in radius from the front to the rear end thereof in a well known manner. The body portion 34 has sloping sides which are engaged by blocks 36 and 37 which are likewise provided with sides which slope in the opposite direction to the sloping side of the body portion 34. Plates 38 are provided between the blocks 36 and 37 and the sides of the recess 18 and are provided with longitudinally sloping surfaces. The plates are adjustable longitudinally by bolts 39 the heads of which register in slots 40 of the plates for effecting the longitudinal positioning of the plates as the bolts are advanced in the thread of the projecting portion 17.

For vertically adjusting the broaching cutter a pair of plates 41 and 42 having oppositely sloping surfaces are supported on the bottom of the recess 18 by bolts 43, the head portions 44 of which register in slots 45 of the plate 42 for permitting the movement of the plate 42 relative to the plate 41. A bolt 46 is threaded into the end of the plate 41. the head thereof registering in a slot 47 in the plate 42 for the purpose of effecting the adjustment of the plate. In this manner the broaching cutter may be accurately adjusted both laterally and vertically to accurately register with the bearing shell 22 for machining the bearing surface thereof.

After the bearing surface has been machined in this manner the U-shaped member 25 is lowered and the bearing shell is forced from the recess 20 by actuating mechanism which will now be described. A plunger 48 extends through an opening 49 in the extending portion 17 to within the recess 20. The opening is enlarged at 51 for the purpose of receiving a spring 52 which encompasses the shaft 48 and biases it upwardly away from the recess 20. A similar plunger 53 is carried in an opening 54 provided in the U-shaped member 25, the opening likewise being enlarged at 55 for the purpose of receiving a spring 56 which biases the plunger inwardly into an aperture 57 in the U-shaped member which is in axial alignment with the opening 49 and the plunger 48.

During the downward movement of the U-shaped member 25 the end of the plunger 53 engages the end of the plunger 48 which is carried downwardly along with the U-shaped member into engagement with the outer surface of the bearing shell 22 for forcing the shell downwardly out of the recess 20. During the downward movement of the U-shaped member 25 a cam 58, which projects upwardly from the projecting portion 17, engages a pin 59 provided on the end of the plunger 53 and causing the lateral movement of the plunger out of the aperture 57. The movement of the plunger 53 releases the end of the plunger 48 and permits it to be moved upwardly because of the bias of the spring 52. In this position the fingers 32 are disposed downwardly away from the blocks 19 and, after the cutter has been reciprocated to have a released portion (not shown) disposed adjacent to the block 19, another bearing 22 may be inserted within the fixture. An oil cup 59 is provided on the extending portion 17 for the purpose of lubricating the sides of the body portion 34 of the broaching cutter as illustrated in Fig. 3. A suitable guide plate 61 is provided on the back face of the casting 16 supported in a recess 62 by screws 63. Arcuate projecting portions 64 extend rearwardly for engaging a recess (not shown) in the face plate 12 for positioning the casting 16 relative to the plate.

The operation of my broaching machine will now be described. After a bearing shell 22 has been machined and removed from the fixture 15 the broaching cutter 14 is reciprocated to its frontmost position in which position a relieved portion is positioned opposite to the block 19. A bearing shell 22, to be machined, is then inserted into the recess 20 with the sides thereof resting upon the top surface of the fingers 32 of the U-shaped member 25. The ram 29 is then actuated to draw the shaft 28 upwardly for moving the U-shaped member 25 and, therefore, the finger 32 to its uppermost position. The upward movement of the fingers 32 carries the shell 22 upwardly into the recess 20 and forces it to assume a true arcuate shape which conforms to that of the recess. The broaching cutter 14 is then actuated through the medium of the pull bar 9 to have the cutting edge 25 thereof pass across the inner surface of the bearing shell 22 and to thereby machine it to arcuate dimensions.

After the broaching cutter 14 has passed across the surface of the bearing 22, the ram 29 is again actuated to force the shaft 28 downwardly and move the U-shaped member 25 and therefore the fingers 32 to their downward positions. During this downward movement the plunger 53 engages the end of the plunger 48 to force the bearing 22 from the recess 20 after which the further downward movement withdraws the plunger 53 from engagement with the plunger 48 to permit the plunger to be moved upwardly by the bias of the spring 52. The broaching cutter 14 is then reciprocated to its frontward position and another bearing shell 22 may be machined in a like manner.

It is to be understood that when the first series of bearing shells are cut they are accurately checked to ascertain whether or not the cutter is positioned in proper relation to the recess 20 and if not the adjustment is effected through the medium of the plates 38 and 42 to accurately position the broaching cutter relative to the recess 20. Once the adjustment is made in this manner, no further checking of the machine is necessary as the relative parts of the fixture and broaching cutter will retain their relationship for an indefinite length of time.

It is to be understood that the bearing shells which are machined in this manner may be those which comprise an outer shell portion which is tinned and provided with a babbit surface in a well known manner or may be bearing portions which are cast entirely from babbit or other metals. It is to be further understood that the fixture described is not limited to the machining of bearings alone but may be employed for broaching a surface of arcuate or other shape on any member which is capable of being supported in a recess by a pair of laterally extending fingers as specified in the foregoing description.

While I have described and illustrated but a single embodiment of my invention, it will be apparent to those skilled in the art that various changes, omissions, additions and substitutions may be made therein without departing from the spirit and scope of my invention, as set forth in the accompanying claims.

I claim:

1. A broaching machine including, in combination, a member provided with a recess for receiving a bearing shell, a reciprocable member adjacent to said recess having means for engaging the side edges of the bearing for forcing it into intimate relation with the surface of the recess, adjustable guide ways at the side and bottom of said body portion, and a broaching cutter movable in said guide ways across the inner surface of said bearing shell and adjustable as to height and lateral position.

2. A broaching machine including, in combination, a member provided with a recess for receiving a bearing shell, a reciprocable member adjacent to said recess having means for engaging the side edges of said shell for forcing it into intimate relation to the surface of the recess, means for positively releasing said bearing from said recess during the reciprocation of said member, a plunger extending into the path of movement of said releasing means for effecting its operation, means for disengaging the plunger from said releasing means after the reciprocable member has moved a predetermined distance, and means for retrieving said releasing means thereafter.

3. A broaching machine including in combination, a member provided with a recess for receiving a bearing shell, a reciprocable member adjacent to said recess having means for engaging the side edges of said shell for forcing it into intimate relation with the surface of said recess, means for actuating said reciprocable member to either of its positions, a spring biased plunger for positively releasing said shell from said recess when the engaging means have been moved therefrom, an element for engaging said plunger to force it to move with said engaging means, means for disengaging said element from said plunger after the reciprocable member has been moved a predetermined distance, and a spring for retrieving said plunger after its release.

4. A broaching machine including, in combination, a member having a face plate through which a cutting element reciprocates, a work supporting element clampable upon said face plate, a fluid ram supported upon said element, a frame carried by said ram having inwardly presenting fingers, a support for a bearing shell to be machined, a plunger in said support, an element in said frame extending into the path of movement of said plunger, means for actuating said ram for moving said frame upwardly to have the fingers clamp a shell in said support, means for actuating said ram for moving said frame downwardly to release said shell and by moving said element therewith to cause the plunger to eject said shell from the support, means for withdrawing said element from the path of movement of the plunger, and means for retrieving said plunger thereafter out of position to be occupied by the shell.

5. A shaping and clamping element for a bearing shell including a fixed recessed member having the shape of a journal in which the shell is to be employed, a U-shaped frame extending around said element having inwardly presenting fingers for engaging the edge of the shell and for forcing it into said recess to conform to the shape thereof, a plunger extending through said element and movable into said recess, a member in said frame extendable into the path of movement of said plunger when the frame is moved downwardly to move the fingers from engagement with said shell, said member engaging the plunger during said downward movement to cause the plunger to force the shell from the recess, means for actuating the member out of the path of movement of said plunger during said downward movement, and means for thereafter retrieving said plunger from within said recess.

WILLIAM A. HART.